(12) United States Patent
Kozlowski

(10) Patent No.: US 6,218,796 B1
(45) Date of Patent: Apr. 17, 2001

(54) STORAGE CART FOR RECHARGEABLE DEVICES

(75) Inventor: Kevin M. Kozlowski, Warrenville, IL (US)

(73) Assignee: Mobile Design Corporation, Willowbrook, IL (US)

( * ) Notice: Subject to any disclaimer, the term of this patent is extended or adjusted under 35 U.S.C. 154(b) by 0 days.

(21) Appl. No.: 09/166,867

(22) Filed: Oct. 6, 1998

(51) Int. Cl.$^7$ .................................. F25D 11/00; H02J 7/00
(52) U.S. Cl. ...................... 318/280; 318/139; 320/107; 320/111; 62/237; 62/239
(58) Field of Search ..................... 318/560–696; 307/43, 80, 85; 180/19.1–19.3, 23, 209; 280/79.11, 47.35; 62/3.61, 3.3, 237, 243, 239; 426/418; 99/325, 334, 352, 355, 357, 467; 358/93, 254; 320/107, 111, 105

(56) References Cited

U.S. PATENT DOCUMENTS

| | | | |
|---|---|---|---|
| 3,733,836 | * | 5/1973 | Corini ........................................ 62/3 |
| 4,167,983 | * | 9/1979 | Seider et al. ....................... 180/19 R |
| 4,316,078 | * | 2/1982 | Mack et al. ........................... 219/386 |
| 4,922,721 | * | 5/1990 | Robertson et al. .................... 62/3.61 |
| 5,056,331 | * | 10/1991 | Lotz ....................................... 62/237 |
| 5,096,195 | * | 3/1992 | Gimmon .......................... 273/138 A |
| 5,142,910 | * | 9/1992 | Litchman .............................. 73/379 |
| 5,210,603 | * | 5/1993 | Sabin .................................... 358/93 |
| 5,448,945 | * | 9/1995 | Taylor et al. ........................ 100/100 |
| 5,642,898 | * | 7/1997 | Wise .................................... 280/652 |
| 5,852,332 | * | 12/1998 | Shearer ................................. 307/43 |
| 5,997,928 | * | 12/1999 | Kaish et al. .......................... 426/418 |
| 6,000,486 | * | 12/1999 | Romick et al. ........................ 180/23 |
| 6,008,621 | * | 12/1999 | Madison et al. ..................... 320/107 |

* cited by examiner

*Primary Examiner*—Paul Ip
(74) *Attorney, Agent, or Firm*—Schiff Hardin & Waite

(57) ABSTRACT

A cart for storing rechargeable devices includes shelves on which the devices are stored. Charging transformers are positioned in an air cooled upper chamber of the cart and electrical connections for connecting the charging transformers are provided in a lower chamber of the cart. Multiple electrical circuits connect the plugs in the lower chamber of the cart to external circuits. Motility of the cart is provided by four swivel caster wheels at the respective corners of the cart and a fifth drive wheel at the center. The drive wheel is powered by an electric motor supplied by a battery.

5 Claims, 3 Drawing Sheets

STORAGE CART FOR RECHARGEABLE DEVICES

BACKGROUND OF THE INVENTION

1. Field of the Invention

The present invention relates generally to a cart for storing rechargeable devices and, in particular, to a driven cart within which rechargeable devices may be recharged.

2. Description of the Related Art

Portable computers, including so-called laptop computers, are being increasingly used in schools and businesses. Such portable computers have the advantage of being small and relatively light in weight and being capable of operation by battery power while still having sufficient processing and storage capability to operate as a fully functional computer. When such portable computers are used in a classroom setting, each member of the class may have a computer for use during the class. This raises the problem of storing the computers when not is use and of maintaining the batteries of the portable computers in a charged state so that the computers are ready for use during the class.

SUMMARY OF THE INVENTION

An object of the present invention is to provide storage for rechargeable devices which enables the devices to be recharged during storage. Another object of the invention is to provide a secure storage facility for rechargeable devices which is easily transported from one location to another. A further object of the invention is to provide for convenient charging of rechargeable devices and for cooling during charging of the devices.

These and other objects and advantages of the invention are provided by a cart having shelves for storing a number of rechargeable devices and including electrical connections within the cart for electrically connecting the rechargeable devices to line power for charging. The cart includes doors by which the rechargeable devices can be locked into the secured interior of the cart. A cooling fan is provided for drawing air through the interior of the cart, the fan preferably being under the control of a thermostat to ensure operation of the fan during high temperature conditions within the cabinet since many rechargeable devices, such as laptop computers, have heat generating transformers which provide the charging current to the rechargeable device. The present cart provides a location for storing the transformers of all rechargeable devices in a single location which is cooled by the fan. The transformers are connected to internal plug sockets in the cabinet, these plug sockets being connected to a number of separate electrical circuits of an electrical supply system. The electrical circuits of the internal plug sockets are connected at external connectors on the side of the cart which can be connected by electrical cords to wall outlets. Preferably, the connectors on the outside wall of the cart are recessed.

A drive system is provided for moving the cart. In a preferred embodiment, the drive system includes a driven wheel by an electric motor which is powered by a battery. In the preferred embodiment, the drive system includes four swivel-mounted wheels at the corners of the cart and a fifth wheel at the center of four swivel wheels, the fifth wheel being driven by the electric motor. A handle is provided on the cart and a switch is provided on the handle for selectively applying power to the electric motor. The switch preferably includes forward and reverse positions for applying power for forward and reverse operation of the motor.

Further features and advantages of the invention will become apparent after review of the drawings and detailed description.

DETAILED DESCRIPTION OF THE PREFERRED EMBODIMENTS

Figure 1:
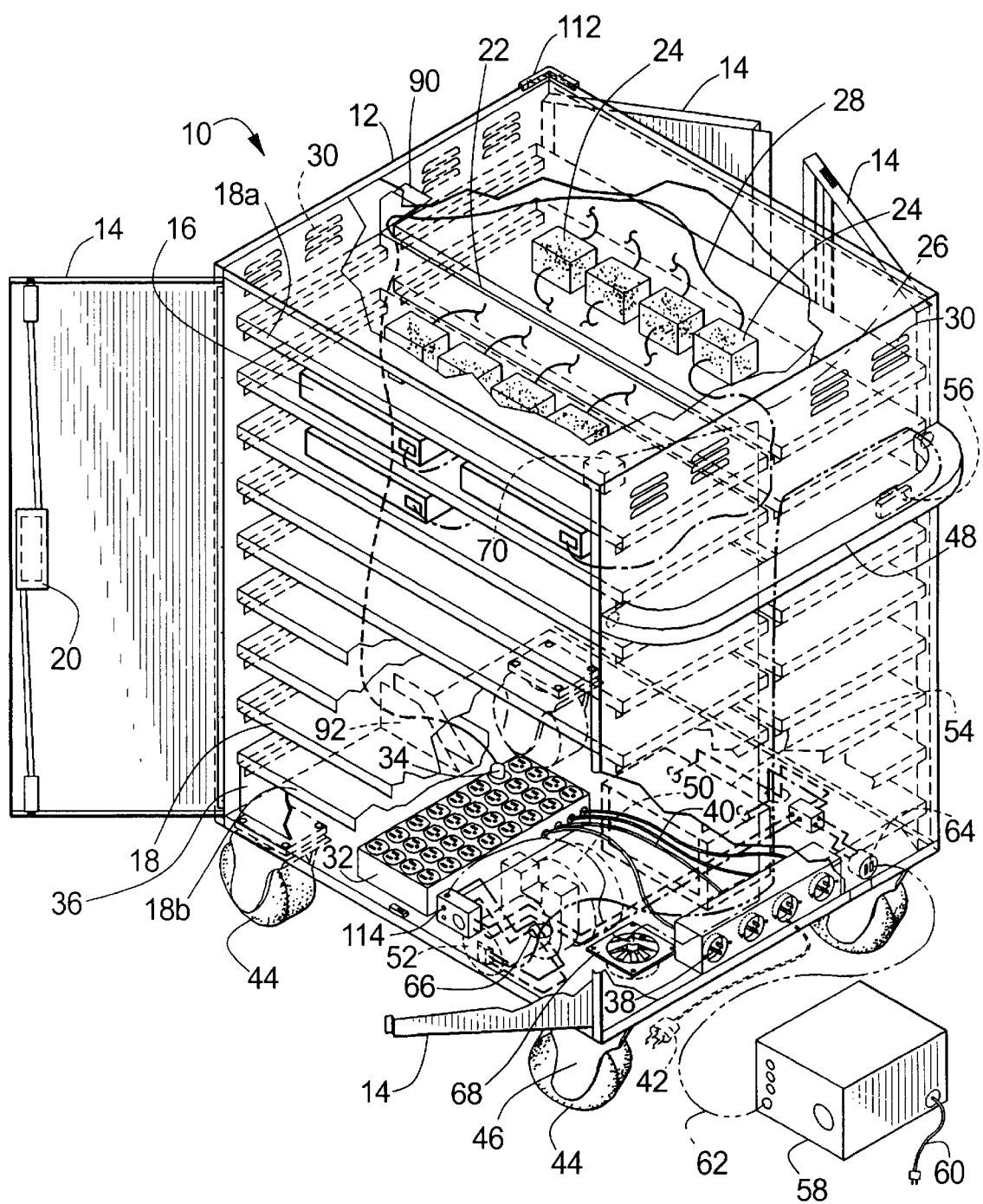
FIG. 1 is a perspective view, partially cut away, of the present cart for rechargeable devices.

Referring first to FIG. 1, the cart 10 of the present invention includes a cabinet 12 having doors 14 to provide an enclosure for rechargeable devices, such as laptop computers 16. The laptop computers 16 are held in the cabinet 12 on shelves 18. A number of shelves 18 are provided in the cabinet to provide sufficient space to store, in one embodiment, 32 laptop computer for charging. Thus, the cabinet 12 accommodates enough laptop computers to provide one for each student in a typical classroom. The shelves 18 are accessed by opening the doors 14. Two doors are provided on each of the two opposite sides of the cabinet 12. The doors 14 preferably include draw tight latches 20 which include a lock so that the cabinet can be closed and locked to prevent unwanted access.

Pairs of the shelves 18 are spaced from one another at the mid line of the cabinet 12 to provide a wire chase 22 through which the electrical wires are runned. The wire chase thus extends from the top to the bottom in the interior of the cart. On the top most shelf 18a are provided the transformers 24 by which power is converted for charging the rechargeable laptop computers 16. A low voltage wire 26 from each of the transformers 24 is runned down through the wire chase 22 for connection to the laptop computer 16. The high voltage wire 28 of the transformer 24 runs down through the wire chase 22 to the lower level of the cart 12. All of the transformers 24 are thus provided at the top of the cabinet 12 so that the heat generated thereby remains at the top of the cabinet and does not risk damaging the electronics within the laptop computers 16. Ventilating louvers 30 are provided in the side walls of the cabinet 12 adjacent the top shelf 18a to permit escape of the heat generated by the transformers 24.

Power is provided to the transformers 24 from a power center or power supply system in the lower level of the cabinet 12. The power center includes a power box 32 into which plugs 34 of the high voltage lines 28 are connected. The power box 32 may either be a single large box or a number of separate power strips containing the sockets for connecting the plugs 34. The high voltage lines 28 are run down the chase 22 from the transformers 24 for connection to the power box 32.

An enclosure wall 36 extends from an underside of a bottom shelf 18b to the bottom of the cabinet 12 to enclose the space containing the power box 32 to prevent access by students using the cart 10.

Electrical power is provided to the power box 32 through recessed male plugs 38 that are accessible at an exterior wall of the cabinet 12. Four such recessed male plugs 38 are provided in the illustrated embodiment corresponding to four 20 amp, 120 volt circuits for the charging system of the cart 10. The recessed male plugs 38 are connected by corresponding wires 40 to the power box 32. In the power box 32, eight plug sockets are provided on each of the four circuits. The charging circuits are connected to wall outlets by four 20 amp, 120 volt extension cords 42 which are plugged into the recessed male plugs 38 during charging and are removed therefrom during moving of the cart 10.

The cart 10 is freely moveable from place to place, such as from classroom to classroom or from classroom to storeroom, by virtue of wheels 44 provided on the underside thereof. The wheels 44 are provided on swivel casters 46 so that the cart may be easily directed and turned as desired. Steering of the cart during movement is accomplished via a handle 48 which extends from the side of the cabinet 12.

When fully loaded with a complement of 32 laptop computers and their transformers, and particularly in light of the heavy duty and durable material of which the cart is to be constructed for security purposes, it is contemplated that the cart may weigh in excess of 500 pounds. To facilitate movement of the cart, a drive system is incorporated which includes a fifth wheel 50 at the center of the bottom of the cart. The fifth wheel 50 is driven by an electric motor 52 which is powered by a battery 54.

Control of electric power to the motor 52 is provided by a switch 56 in the handle 48. The switch 56 preferable rocks between two positions to provide forward and reverse operation of the drive wheel 50.

Since operation of the motor 52 to move the cart about draws down the charge in the battery 54, a battery charger 58 is provided. The battery charger 58 of the illustrated embodiment is an external battery charger having a power cord 60 for connection to a wall outlet and a charging cord 62 for connection to a charging socket 64 in an external wall of the cabinet 12. In one embodiment, the battery 54 is a 12 volt battery and the charger 58 is a floating charger. The wiring to connect the drive motor 52 to the battery 54 and to the charging plug 64 are provided within the enclosure beneath the bottom shelf 18b and behind the enclosure wall 36. An opening 66 is provided in the bottom plate of the cabinet 12 through which the wires pass to provide power and control to the motor 52.

As noted above, operation of the present cart 10 for charging the rechargeable devices 16 results in the generation of heat within the cabinet 12. To facilitate removal of the heat from the cabinet, a fan 68 is provided in the bottom plate of the cabinet 12. The fan is controlled by thermostat 70 mounted in the top portion of the cabinet 12 for sensing the temperature in the space adjacent the transformers 24. Power to the fan 68 is provided from the battery 54. The preferred fan is a 12 volt DC fan and may include a lint screen or foam lint guard to prevent fibers from being blown into the cabinet 12 during operation of the fan.

Figure 2:
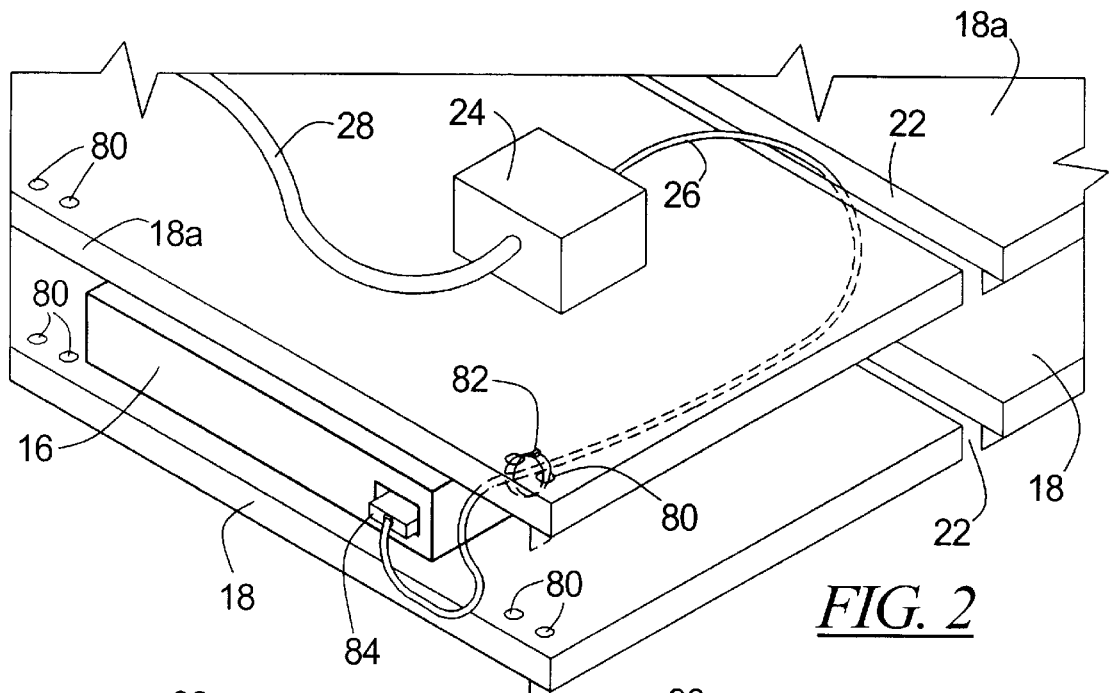
FIG. 2 is an enlarged fragmentary perspective view of a rechargeable electrical device on a shelf in the cart connected for recharging.

Referring to FIG. 2, two of the shelves 18 are shown, the upper shelf being the top shelf 18a of the cabinet. On the lower shelf 18 is resting the laptop computer 16 which requires charging of its internal battery. External power is provided through the high voltage line 28 to the transformer 24 which reduces the voltage, the reduced voltage being output from the transformer 24 at the low voltage line 26. The low voltage line 26 runs from the top shelf 18a containing the transformer 24 down the wire chase 22 between the shelf 18 until it reaches the shelf on which the corresponding laptop computer is positioned. Pairs of openings 80 are provided in the shelves 18 through which a cable tie 82 is fastened to secure the low voltage line 26 at a convenient position for connection to the laptop computer 16. The laptop computer 16 is placed on the shelf 18 face in so that its back connecting surface is available to the user of the cart. A charging connector 84 on the low voltage line 26 is easily connected into the corresponding charging socket on the laptop computer 18. The paired openings 80 for receiving the cable ties 82 are positioned at both sides of the shelf location for each rechargeable laptop computer 16 so that the low voltage cable 26 may be positioned at either side of the computer as desired. By positioning the low voltage cable to the side of the computer, it does not interfere with the insertion and removal of the laptop computer 16 from its shelf location. Two such pairs of cable connecting openings are provided at each computer storage space.

Figure 3:
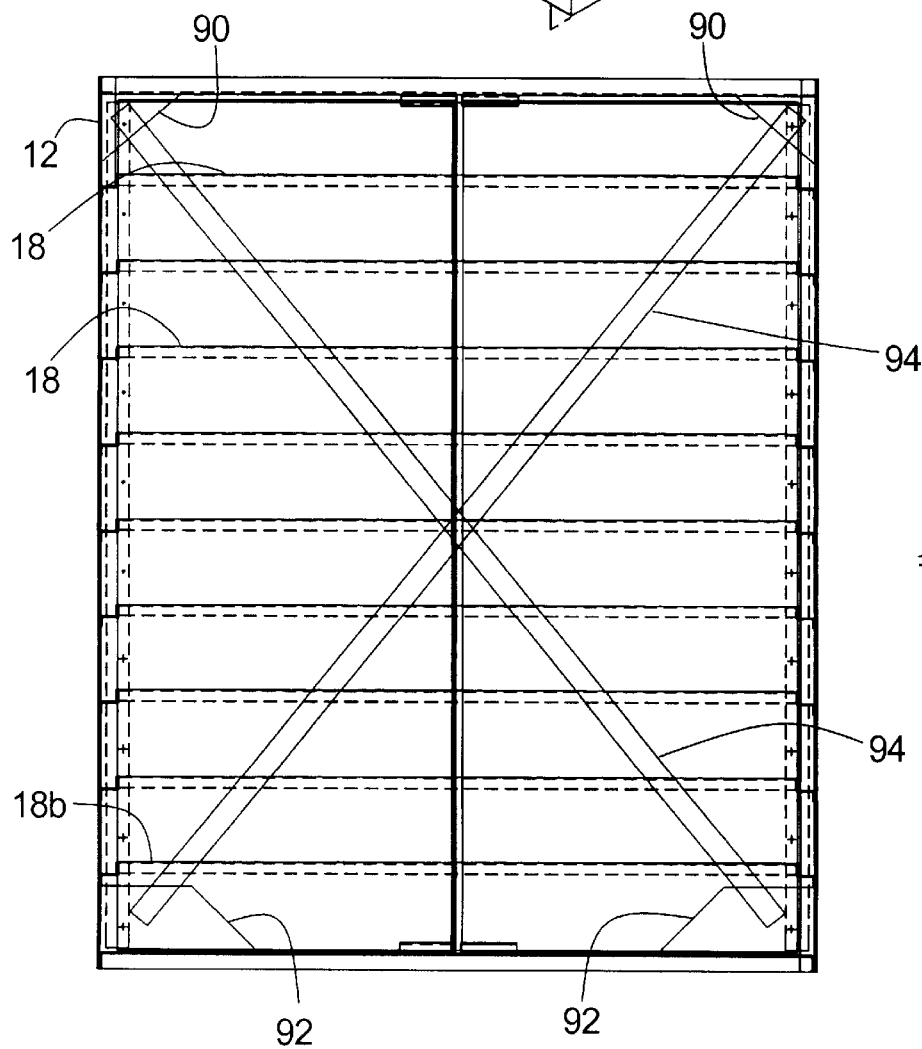
FIG. 3 is a side elevational view of the interior of the body of the cart.

Referring to FIG. 3, the internal support structure of the cabinet 12 is shown including the shelves 18 with the top shelf 18a and bottom shelf 18b being shown as well. Corner gussets 90 at the top corners and 92 at the bottom corners are shown for reenforcing the cabinet 12 and cross bracing 94 extends from corner to corner for added stability. The gussets 90 and 92 are shown as well in FIG. 1. The cross bracing 94 which is not shown in FIG. 1 but which is illustrated in FIG. 3 extends through the wire chase 22. Thus, the cabinet is made stronger so as to withstand the rigors of classroom use.

Figure 4:
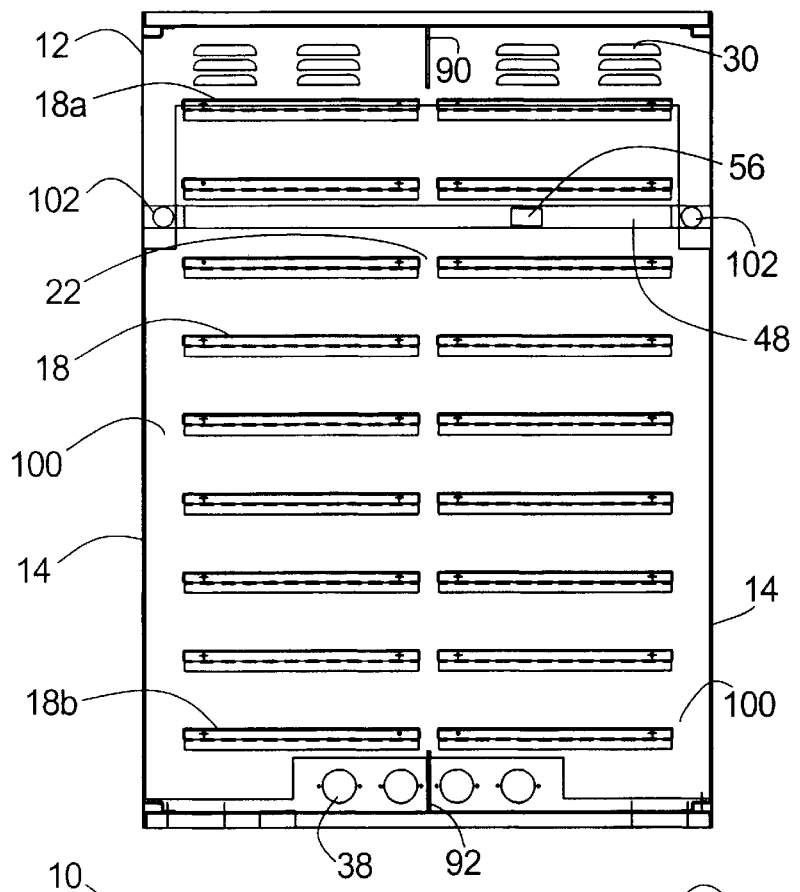
FIG. 4 is a side elevational view of an interior wall of the body of the cart.

FIG. 4 shows an interior of a side panel of the cabinet 12, including a reinforcing plate. The shelves 18 are shown with the wire race 22 between the paired shelves the wire race 22 as well as air flow gaps 100 between the front edges of the shelves 18 and the doors 14 provide air flow from bottom to top of the cabinet for the fan 68 (see FIG. 1). The air flow is facilitated by the louvers 30 in the side wall above the top shelf 18a. Also seen on the side wall are the connectors 102 for the handle 48. The location of the switch 56 is also shown in the view of FIG. 4. The reinforcing gussets 90 and 92 are provided in the interior of the cabinet between the shelves at the wire chase 22. Openings for the recessed male connectors 38 are also shown in the Figure.

The drive system of the present invention provides important advantages to facilitate easy movement and steering of the cart 10 even when it is heavily loaded. The drive system shown on the present cart for storing and charging rechargeable devices may also be utilized in a wide range of carts and other moveable devices.

Figure 5:
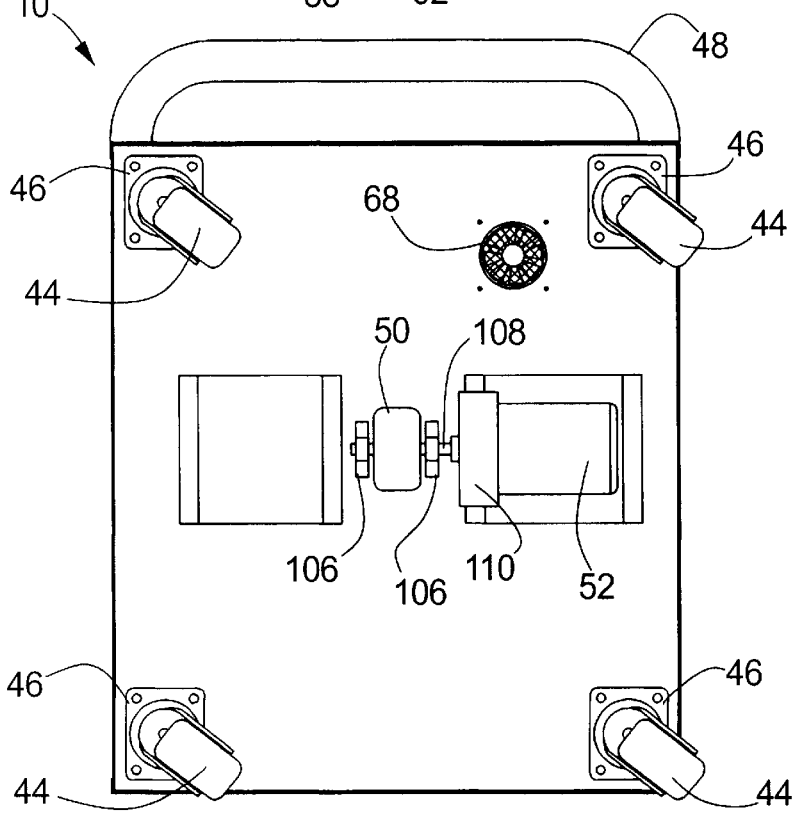
FIG. 5 is a bottom plan view of the cart showing the motor with the fifth wheel and the battery.

FIG. 5 illustrates the principles of the drive system including the swivels 46 on which are mounted the wheels 44 at each of the corners of the cart 10. The drive wheel 50 is positioned at the center of the cart 10 on the underside thereof lying in the same plane as the wheels 44. To ensure contact of all wheels with the floor surface, the wheels include pneumatic tires. The tires are preferably foam filled to reduce maintenance. The drive wheel 50 is supported by bearings 106 on its axle 108 which is directly driven by the motor 52. A gear reducer 110 is provided for reducing the speed of the motor 52 to an appropriate drive speed for the wheel 50. The motor 52 is a DC motor operating at 12 volts. Power for the motor 52 is provided from the 12 volt battery 54 that is mounted on the underside of the cart 10 as well. In the illustrated embodiment, the battery 54 is positioned in a symmetrical position with the motor 52 for balancing the load in the cart. The arrangement of the four castered wheels 44 with the fifth drive wheel 50 provides a highly maneuverable cart which requires little effort on the part of the operator to move even when heavily loaded. The drive wheel 50 may be switched to either forward or reverse operation by the control switch 56 on the handle 48. In a preferred embodiment, a lock is provided on the control switch 56 to enable only authorized users to move the cart.

The cooling fans 68 may be seen in the bottom plate of the cart 10 in the view of FIG. 5.

The highly maneuverable nature of the present cart may result in the cart inadvertently contacting other objects such as walls or doors. Accordingly, bumpers 112 of a resilient material are preferably provided at the corners of the cart. One such bumper is shown in FIG. 1. Other corner bumpers are left off for the sake of simplicity, although it is desirable to provide bumpers on all corners of the cart.

It is also desirable to provide fuses in the electrical circuits, including in those electrical circuits for the operation of the motor and the fan and for charging of the battery. Accordingly, a fuse 114 is provided in the enclosed base as shown in FIG. 1.

Thus, there is shown and described a cart for storing laptop computers in sufficient quantity to provide an attire classroom with computers, for simultaneously charging the batteries of the computers and for readily moving the stored computers from place to place. The present cart is preferably of heavy duty and durable material to provide security and strength while enclosing the expensive computers. Electrical circuitry is enclosed within the lower enclosure of the cart away from the access by students and other non-service personnel. The low voltage connectors for charging the computers are positioned conveniently adjacent the computer sockets for receiving the connectors not only for accessibility to the connectors but also to provide a neat appearance.

As stated above, the drive system for moving the present cart may be applied to a variety of carts and other wheeled devices to facilitate movement and maneuverability of the devices. Examples of wheeled devices on which use of the present drive system is contemplated include food carts for hospitals and food service facilities, carts for movement of articles in manufacturing locations, etc.

The principles of the present invention may also be utilized in a cart for storing and charging rechargeable devices other than laptop computers. For example, power tools use by construction workers and mechanics are being increasingly replaced by battery powered power tools. The present cart may be used to store and charge battery powered drills, saws and other tools in a mechanics shop or construction site.

Although other modifications and changes may be suggested by those skilled in the art, it is the intention of the inventors to embody within the patent warranted hereon all changes and modifications as reasonably and properly come within the scope of their contribution to the art.

I claim:

1. A cart for rechargeable devices, comprising:
    a cabinet defining an interior space;
    a plurality of rechargeable device holding locations in said interior space on which to place said rechargeable devices;
    doors on said cabinet to close said interior space;
    an electrical supply system in said cabinet to which to connect the rechargeable devices for charging, said electrical supply system includes:
        a distribution box having a plurality of plug sockets in said interior space; and
        a connection from said distribution box through an external wall of said cabinet and connecting to external power.

2. A cart as claimed in claim 1, wherein said connection is a recessed connector mounted in the external wall of said cabinet.

3. A cart as claimed in claim 1, wherein said connection is a first connection and said cable is a first cable, and further comprising:
    at least a second connection to the external wall of said cabinet; and
    at least a second cable connecting corresponding ones of said at least second connection to external power.

4. A cart for storing and transporting rechargeable devices, comprising:
    a cabinet defining an interior space;
    doors on two opposite sides of said cabinet for selectively closing said interior space;
    a plurality of rechargeable device holding locations in said interior space on which the rechargeable devices is placeable, said shelves on said two opposite sides of said cabinet being spaced apart by a gap to define a wire chase;
    an electrical supply system in said cabinet to which to connect the rechargeable devices for charging, said electrical supply system including:
        a distribution box having a plurality of plug sockets, and a cable connecting said distribution box to external power;
        a fan mounted in said cabinet and operable to move air within said interior space;
        air flow vents in walls of said cabinet;
        a thermostat connected to control said fan;
        a plurality of swivel-mounted wheels at a perimeter of said cabinet at an underside;
        a driven wheel at a center of the underside of said cabinet, said driven wheel being fixed in a position of its axis;
        a motor connected to said driven wheel;
        a battery connected to supply power to said motor and to said fan; and
        a switch for alternately selecting forward and reverse operation of said driven wheel.

5. A cart as claimed in claim 4, wherein said plurality of swivel-mounted wheels are four swivel-mounted wheels mounted adjacent corresponding corners of said cabinet, and further comprising:
    pneumatic tires mounted on each of said four swivel mounted wheels and on said driven wheel.

\* \* \* \* \*